C. F. KERNEN.
TIRE FOR AUTOMOBILES.
APPLICATION FILED FEB. 19, 1914.
1,107,672.
Patented Aug. 18, 1914.
2 SHEETS—SHEET 1.
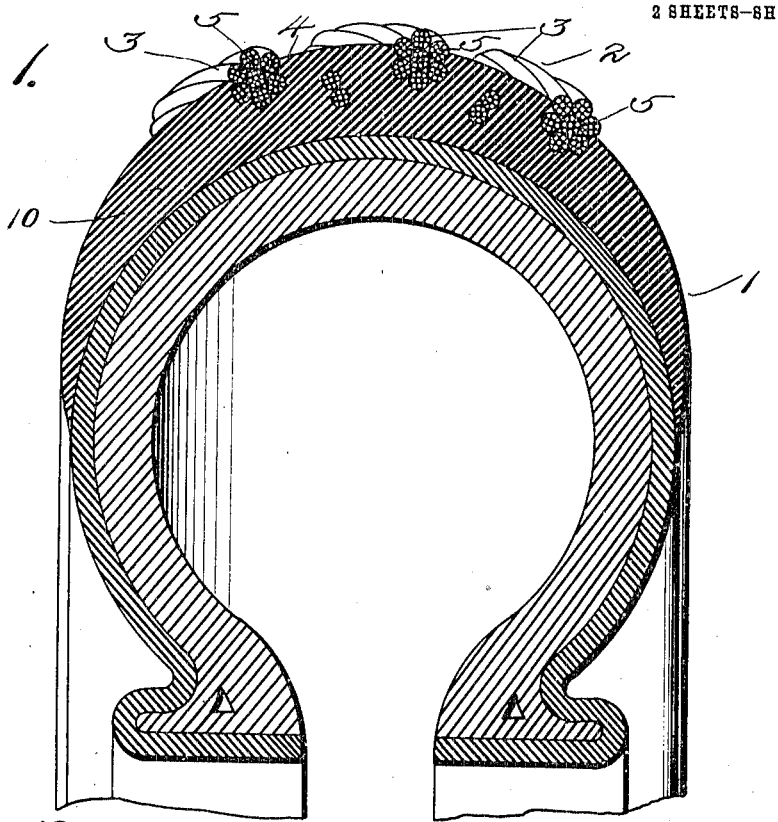
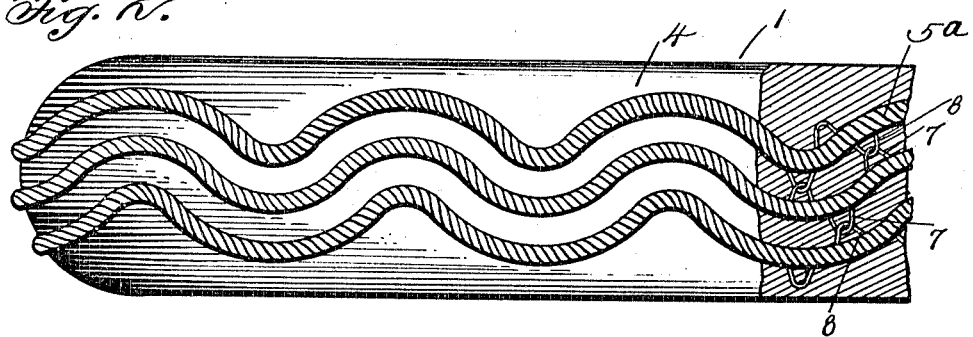
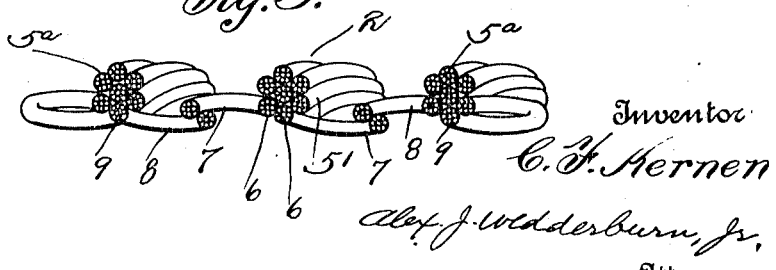

C. F. KERNEN.
TIRE FOR AUTOMOBILES.
APPLICATION FILED FEB. 19, 1914.
1,107,672.
Patented Aug. 18, 1914.
2 SHEETS—SHEET 2.
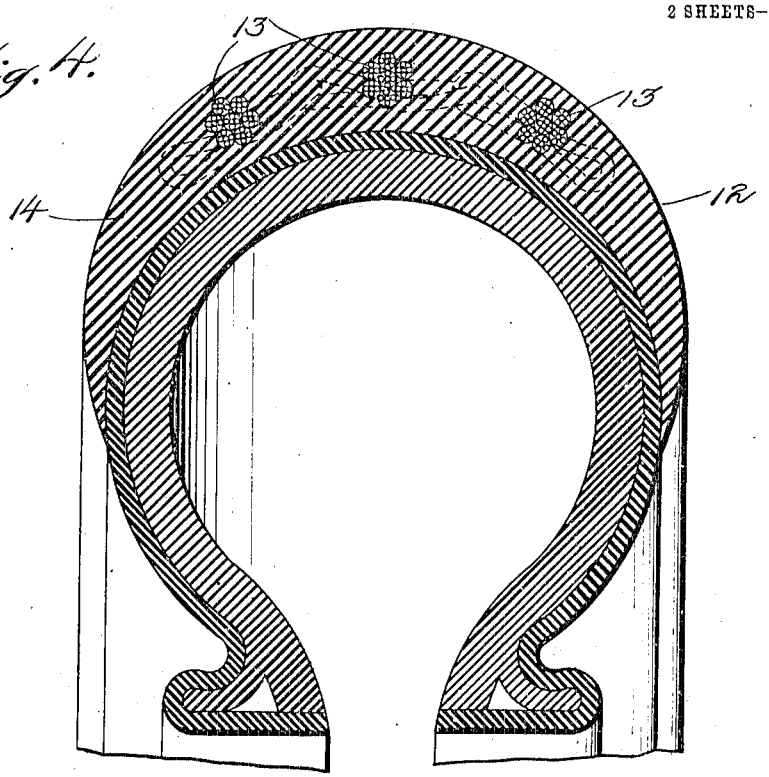
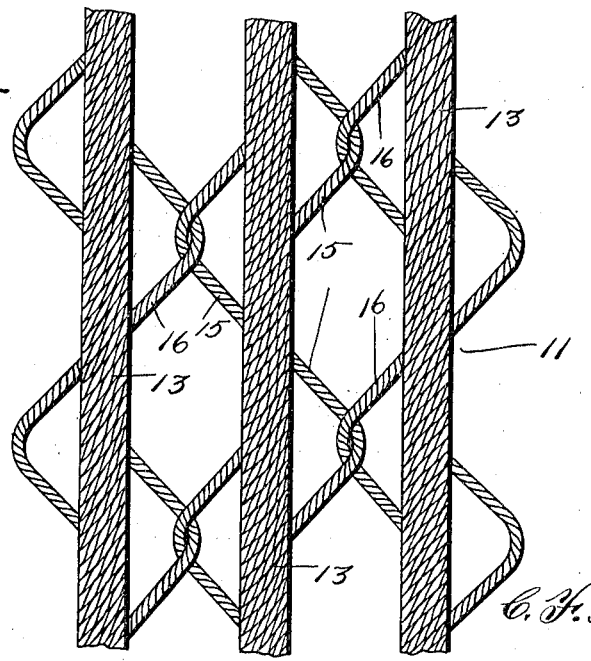
Witnesses
M. P. McKee
G. C. Tracy
Inventor
C. F. Kernen
Alex. J. Wedderburn, Jr.
Attorney

UNITED STATES PATENT OFFICE.

CLIFFORD F. KERNEN, OF CINCINNATI, OHIO.

TIRE FOR AUTOMOBILES.

1,107,672.  Specification of Letters Patent.  Patented Aug. 18, 1914.

Application filed February 19, 1914. Serial No. 819,836.

*To all whom it may concern:*

Be it known that I, CLIFFORD F. KERNEN, a citizen of the United States, residing at Cincinnati, in the county of Hamilton and State of Ohio, have invented certain new and useful Improvements in Tires for Automobiles, of which the following is a specification.

This invention relates to improvements in tires for automobile or other vehicle wheels and has for its object to provide a combined reinforcing and anti-skidding device.

Another object of the invention is to provide a reinforcing intermeshed fabric for rubber tires.

Still another object of the invention is to provide a resilient wheel tire having an anti-skidding device embedded therein and protruding from the tread surface thereof.

With the above and other objects in view, I have invented the device illustrated in the accompanying drawings in which—

Figure 1 is a transverse sectional view through my improved tire, Fig. 2 is a plan view of a portion of tread of the tire fabric being entirely exposed at one place, Fig. 3 is a detail transverse section of the fabric used in said tire, Fig. 4 is a view similar to Fig. 1 of a modification of the device, and Fig. 5 is a detail plan view of the reinforcing fabric used in Fig. 4.

Like reference characters indicate like parts throughout the specification and in the several views in the drawings in which—

1 indicates a tire having a metallic fabric 2 embedded therein and having portions 3 partially protruding from the tread surface 4 thereof. The fabric 2 is formed of a series of spaced apart cables 5 formed sinuously so that their protruding portions 3, which act as an anti-skidding device will have a tendency to bite into the ground surface and oppose any tendency of the tire to slide either with or transversely of the travel of the tire. The fabric 2 is formed by having certain strands 6 protrude at intervals from one of the cables 5' and form loops 7 which intermesh with loops 8 formed by the strands 9 protruding from the cable 5ª whereby said cables are held in fixed relation. The loop forming strands all protrude from the inner or under portion of the cables whereby said loops are on a common plane and are buried deeper into the rubber 10 than any other portions of the fabric whereby said cables will be held in place in the rubber until the tire is worn too thin for further use.

In Figs. 4 and 5 I show a slight modification of the invention in which the fabric 11 is used entirely for a reinforcing for the tire 12, the cables 13 being entirely embedded in the rubber 14, the connecting loops 15 and 16 being arranged in the same relative position to the cables as that previously described.

Having now described my invention, that which I claim to be new and desire to procure by Letters Patent is:

1. The described device consisting of a tire having a fabric of wire cables formed by interlooping strands from said cables embedded therein.

2. The described device consisting of a tire having a fabric of wire cables formed by interlooping strands from said cables embedded therein, said strands all protruding from the under portions of said cables.

3. The described device consisting of a tire having a fabric of wire cables formed by interlooping strands from said cables embedded therein, said strands all protruding from the under portions of said cables, said cables partially protruding from the surface of said tire.

4. The described device consisting of a tire having a fabric of wire cables formed by interlooping strands from said cables embedded therein, said strands all protruding from the under portions of said cables, said cables partially protruding from the surface of said tire, said cables being formed sinuous.

In testimony whereof I affix my signature in presence of two witnesses.

CLIFFORD F. KERNEN.

Witnesses:
 L. E. ORR,
 CARL H. SMITH.